(12) United States Patent
Zhou et al.

(10) Patent No.: US 10,501,132 B2
(45) Date of Patent: Dec. 10, 2019

(54) INSPECTION APPARATUS AND METHOD FOR PATROL-INSPECTION OF RIGID CAGE CHANNEL

(71) Applicant: CHINA UNIVERSITY OF MINING AND TECHNOLOGY, Xuzhou, Jiangsu (CN)

(72) Inventors: Gongbo Zhou, Jiangsu (CN); ZhaoXing Gao, Jiangsu (CN); Chaoquan Tang, Jiangsu (CN); Zhencai Zhu, Jiangsu (CN); Guohua Cao, Jiangsu (CN); Ping Zhou, Jiangsu (CN); Hao Chen, Jiangsu (CN)

(73) Assignee: CHINA UNIVERSITY OF MINING AND TECHNOLOGY, Xuzhou, Jiangsu (CN)

( * ) Notice: Subject to any disclaimer, the term of this patent is extended or adjusted under 35 U.S.C. 154(b) by 0 days.

(21) Appl. No.: 16/093,891

(22) PCT Filed: Dec. 7, 2016

(86) PCT No.: PCT/CN2016/108878
§ 371 (c)(1),
(2) Date: Oct. 15, 2018

(87) PCT Pub. No.: WO2018/072274
PCT Pub. Date: Apr. 26, 2018

(65) Prior Publication Data
US 2019/0225287 A1    Jul. 25, 2019

(30) Foreign Application Priority Data

Oct. 17, 2016  (CN) .......................... 2016 1 0901585

(51) Int. Cl.
*B62D 57/024* (2006.01)
*G01D 21/02* (2006.01)
*B62D 55/265* (2006.01)

(52) U.S. Cl.
CPC .......... *B62D 57/024* (2013.01); *G01D 21/02* (2013.01); *B62D 55/265* (2013.01)

(58) Field of Classification Search
CPC .... B62D 57/024; B62D 55/265; B62D 55/26; G01D 21/02
(Continued)

(56) References Cited

U.S. PATENT DOCUMENTS 4,569,230 A * 2/1986 Asty .................... G21C 17/013
                                                          376/249
4,828,059 A * 5/1989 Naito .................. B62D 55/265
                                                          180/119

(Continued)

FOREIGN PATENT DOCUMENTS

CN         20167793 U    12/2010
CN        103802086 A     5/2014
(Continued)

*Primary Examiner* — Robert R Raevis
(74) *Attorney, Agent, or Firm* — Seed IP Law Group LLP (57) ABSTRACT

The present invention discloses an apparatus and method for patrol-inspection of a rigid cage channel. The patrol-inspection apparatus comprises a moving member, a transmission member, a driving member, a guide member, and a housing on a main bottom plate. The driving member comprises a tilt sensor and a pressure sensor connected to a microcontroller, the microcontroller is connected to a driver, the driver is connected to a brushless DC motor, and an output shaft of the brushless DC motor is provided with an optical encoder connected to the driver; The moving member comprises a driving output shaft and a driven output shaft, wheel flanges on the driving output shaft and the driven output shaft are each connected with a wheel hub, a permanent magnet is (Continued)

provided in the wheel hub, and a rubber skin is provided on the outer side of the wheel hub; The transmission member comprises a worm connected with the output shaft of the brushless DC motor, a worm wheel on the driving output shaft and meshed with the worm, timing pulleys on the driving output shaft and the driven output shaft, and a timing belt wound on the timing pulleys. The guide member comprises a guide wheel. The present invention increases inspection speed of the rigid cage channel and improves indirectly the production efficiency of the coal mine enterprise.

9 Claims, 6 Drawing Sheets

(58) Field of Classification Search
USPC ......... 73/866.5, 618–626, 78, 152.57, 865.8; 33/542, 544–544.6, 341, 343; 299/1.05, 299/10, 12
See application file for complete search history.

(56) References Cited

U.S. PATENT DOCUMENTS

| 2009/0120215 | A1* | 5/2009 | Jacobson | G05D 1/0891 |
| | | | | 73/865.8 |
| 2011/0169938 | A1* | 7/2011 | Webster | F22B 37/002 |
| | | | | 348/82 |
| 2014/0338472 | A1* | 11/2014 | Chang | G21C 17/017 |
| | | | | 73/865.8 |

FOREIGN PATENT DOCUMENTS

| CN | 205558975 U | 9/2016 |
| FR | 2766782 A1 | 2/1999 |

* cited by examiner

INSPECTION APPARATUS AND METHOD FOR PATROL-INSPECTION OF RIGID CAGE CHANNEL

BACKGROUND

Technical Field

The present disclosure belongs to the field of inspection of an equipment in a mine hoisting system, and relates in particular to an apparatus and method for patrol-inspection of a rigid cage channel.

Description of the Related Art

At present, inspection of a rigid cage channel in China's mines mainly relies on maintenance personnel, and there are no independently driven autonomous inspection equipment, therefore the inspection of defects in the rigid cage channel has a low accuracy. When tilt and deformation of the rigid cage channel reach a certain degree, smoothness in the operation of a hoisting container is reduced, which poses a potential safety hazard to the hoisting system. In severe cases, it may even cause accidents such as derailment of the container, jamming of the cage, and falling of the cage.

With the increase of coal mining depth, it has become a focus of interest for scholars at home and abroad as to whether a circular cross-sectional shape of the wellbore is the optimum solution. Some scholars have suggested that the cross-sectional shape of the wellbore should be designed as an elliptical or polygonal cylindrical shape based on different mining depths and mining pressures in order to ensure a minimum pressure on the wellbore wall. During operation with such a well construction method, it cannot be ensured that the rigid cage channel is installed at positions at an equal distance from a fixed position. In this case, the rigid cage channel is more likely to be deformed due to external factors. Therefore, real-time accurate inspection and timely resolution of defects in the rigid cage channel have become a challenge to research on safety inspection of coal mines.

BRIEF SUMMARY

Embodiments of the present invention provide an apparatus and method for patrol-inspection of a rigid cage channel intended to find misalignment and tilt defects in a rigid cage channel made of a cold-bend rolled square tube in a deep well hoisting system.

Embodiments of the present invention include an apparatus for patrol-inspection of a rigid cage channel includes a main bottom plate and a moving member, a transmission member, a driving member, a guide member, and a housing disposed on the main bottom plate;

the housing is disposed at a middle portion of the main bottom plate, the driving member is disposed inside the housing, the driving member includes a tilt sensor, the tilt sensor is connected to a microcontroller, the microcontroller is connected to a driver, the driver is connected to a brushless DC motor, an output shaft of the brushless DC motor is provided with an optical encoder, the optical encoder is connected to the driver;

the moving member includes a front-wheel driving output shaft, a front-wheel driven output shaft, a rear-wheel driving output shaft, and a rear-wheel driven output shaft, the front-wheel driving output shaft and the front-wheel driven output shaft are located at a front end of the main bottom plate, the rear-wheel driving output shaft and the rear-wheel driven output shaft are located at a rear end of the main bottom plate, a wheel flange is provided on each of the front-wheel driving output shaft, the front-wheel driven output shaft, the rear-wheel driving output shaft, and the rear-wheel driven output shaft, the wheel flange is connected with a wheel hub, a permanent magnet is provided in the wheel hub, and a rubber skin is provided on the outer side of the wheel hub;

the transmission member includes a worm connected with the output shaft of the brushless DC motor, a worm wheel disposed at the front-wheel driving output shaft and the rear-wheel driving output shaft and meshed with the worm, and timing pulleys disposed at the front-wheel driving output shaft, the front-wheel driven output shaft, the rear-wheel driving output shaft, and the rear-wheel driven output shaft, a timing belt is wound on the timing pulleys of the front-wheel driving output shaft and the rear-wheel driven output shaft, and a timing belt is wound on the timing pulleys of the front-wheel driven output shaft and the rear-wheel driving output shaft; and the guide member includes a front-wheel guide wheel and a rear-wheel guide wheel, and the front-wheel guide wheel and the rear-wheel guide wheel are both disposed on the outside of the wheel hub.

Further, the front-wheel guide wheel and the rear-wheel guide wheel are both hinged with one end of a guide wheel frame through a hinge hole, the other end of the guide wheel frame is hinged with a guide support through a hinge hole, the guide support is fixed to the main bottom plate, one end of a spring link is hinged with the guide support through a hinge hole, the other end of the spring link passes through an elliptical hole in a middle portion of the guide wheel frame and is provided with an adjusting nut, a spring is sleeved on the spring link between the adjusting nut and the guide wheel frame, and a pressure sensor of the driving member is located between the adjusting nut and the spring.

Further, an axle of the front-wheel guide wheel, the front-wheel driving output shaft, and the front-wheel driven output shaft are located in the same plane, and the rear-wheel guide wheel, the rear-wheel driving output shaft, and the rear-wheel driven output shaft are located in the same plane.

Further, bolts on the wheel flanges are mated with bolt holes on the front-wheel driving output shaft, the front-wheel driven output shaft, the rear-wheel driving output shaft, and the rear-wheel driven output shaft, keys on the worm wheel are mated with keyways on the front-wheel driving output shaft and the rear-wheel driving output shaft, and the timing pulleys are fixed relative to the front-wheel driving output shaft, the front-wheel driven output shaft, the rear-wheel driving output shaft, and the rear-wheel driven output shaft through set screws.

Further, one end of each of the front-wheel driving output shaft, the front-wheel driven output shaft, the rear-wheel driving output shaft and the rear-wheel driven output shaft has a thread and the thread is mated with a lock nut, the other end of each of the front-wheel driving output shaft, the front-wheel driven output shaft, the rear-wheel driving output shaft, and the rear-wheel driven output shaft is mated with a bearing A, and the bearing A is fixed to a horizontal bearing seat A, a middle portion of each of the front-wheel driving output shaft, the front-wheel driven output shaft, the rear-wheel driving output shaft, and the rear-wheel driven output shaft is mated with a bearing B, and the bearing B is fixed to a horizontal bearing seat B, and the horizontal bearing seat A and the horizontal bearing seat B are both fixed to the main bottom plate.

Further, the front-wheel driving output shaft, the front-wheel driven output shaft, the rear-wheel driving output shaft, and the rear-wheel driven output shaft each have an on-shaft step A for mounting and positioning the timing pulley, an on-shaft step B for mounting and positioning the bearing B, and an on-shaft step C for mounting and positioning the wheel flange, and the front-wheel driving output shaft and the rear wheel driving output shaft further have an on-shaft step D for mounting and positioning the worm wheel.

Further, one end of the worm is connected with the output shaft of the brushless DC motor via a rigid coupling, the rigid coupling is fixedly mated with the bearing on the vertical bearing seat A, the other end of the worm is mated with the bearing C, and the bearing C is fixed to the vertical bearing seat B.

Further, an output of the microcontroller is connected to an input of the driver through a PWM module, and an output of the driver is connected to an input of the microcontroller through a UART interface.

Further, the permanent magnet includes eight pairs of sub-magnets made of rare-earth neodymium iron boron arranged in a Halbach array with an angle between magnetization directions of two adjacent sub-magnets being 67.5 degrees.

A method for patrol-inspection of a rigid cage channel by the patrol-inspection apparatus described above is characterized in that the method comprises the following steps:

a first stage of statistical calculation of data and periodic adjustable-speed patrol-inspection, in which data acquired by the tilt sensor, the optical encoder, and the pressure sensor throughout operation of the patrol-inspection apparatus is used as raw data for processing and adjustable-speed patrol-inspection control is performed on the patrol-inspection apparatus based on the processing results, including specifically:

a. based on a data acquisition frequency of the tilt sensor, the optical encoder, and the pressure sensor, taking data acquisition instants of the tilt sensor, the optical encoder, and the pressure sensor as a time sequence for data arrangement, matching the data of tilt angles $\theta_z$ and $\theta_x$ detected by the tilt sensor, the data of speed v detected by the optical encoder, and the data of pressures P1 and P2 detected by the pressure sensor at each data acquisition instant with each other and reading the data into an upper computer as raw data, wherein the tilt angle $\theta_z$ is an angle between the y-axis and x-y plane, the tilt angle $\theta_x$ is an angle between the y-axis and the y-z plane, the y-axis is parallel to the rigid cage channel and perpendicular to the front-wheel driving output shaft, the x-axis is perpendicular to the front-wheel driving output shaft and perpendicular to the rigid cage channel, the z-axis is perpendicular to the rigid cage channel and parallel to the front-wheel driving output shaft, the speed v is an operating speed of the patrol-inspection apparatus, the pressure P1 is a pressure applied to the rigid cage channel by the front-wheel guide wheel, and the pressure P2 is a pressure applied to the rigid cage channel by the rear-wheel guide wheel;

b. accumulating successively a product of the speed v and the inspection time $\Delta t$ at every data acquisition instant to obtain a travelled distance, comparing the obtained travelled distance with (L1-L2), if the result is less than (L1-L2), performing, automatically by the patrol-inspection apparatus, high-speed patrol-inspection, if the result is greater than (L1-L2), continuing with accumulation and comparison until the result with L1, if the result is greater than (L1-L2) and less than L1, performing, by the patrol-inspection apparatus, low-speed patrol-inspection, and if the result is greater than L1, clearing the accumulated result to complete a cycle of adjustable-speed patrol-inspection process, wherein $\Delta t$ is a time difference between two adjacent data acquisition instants, L1 is a total length of a single segment of rigid cage channel, and L2 is manually defined as a high-speed patrol-inspection length at the joints of the ends of a single segment of rigid cage channel;

c. taking the last data acquisition instant of the previous patrol-inspection cycle as the starting point;

d. returning to and performing step b until the periodic adjustable-speed inspection is completed for the entire target under inspection, and storing all the detected data;

a second stage of calculation in which the statistical data is processed, including specifically:

a. extracting the tilt angles $\theta_z$ and $\theta_x$ at each time acquisition instant, and calculating a difference value between the pressures P1 and P2 at this instant, determining whether the difference value is 0, if the difference value is zero, determining the tilt angle $\theta_z$ as valid, and if the difference value is not zero, determining the tilt angle $\theta_z$ as invalid and taking a value of 0;

b. calculating a relative displacement dimension in the x direction, a relative displacement dimension in the y direction, and a relative displacement dimension in the z direction of the front-wheel driving output shaft with respect to the rear-wheel driven output shaft at each data acquisition instant, wherein the relative displacement dimension in the x direction is calculated as a distance between the front and rear wheels multiplied by a cosine value of the tile angle $\theta_z$ and then multiplied by a sine value of the tilt angle $\theta_x$, the relative displacement dimension in the y direction is calculated as the distance between the front and rear wheels multiplied by a cosine value of the tile angle $\theta_z$ and then multiplied by a cosine value of the tilt angle $\theta_x$, and the relative displacement dimension in the z direction is calculated as the distance between the front and rear wheels multiplied by a cosine value of the tile angle $\theta_x$ and then multiplied by a sine value of the tilt angle $\theta_z$, wherein the distance between the front and rear wheels is a dimension of the spacing between the front-wheel driving output shaft and the rear-wheel driven output shaft;

c. storing the calculated results and completing calculation of all the data;

a third stage of accumulation and comparison, including specifically:

a. assuming that the patrol-inspection apparatus is in a first patrol-inspection cycle and the absolute coordinate of the front-wheel driving output shaft at each data acquisition instant is known, where the x direction is 0, the y direction is an accumulated value of a speed v multiplied by the patrol-inspection time of the patrol-inspection apparatus, and the z direction is 0, such an assumption being consistent with an initial operating-condition determination of the rigid cage channel inspection that there is no defect in the rigid cage channel during a first travel cycle;

b. selecting a first data acquisition instant during the first patrol-inspection cycle as an initial reference point;

c. accumulating successively a product of the speed v and the inspection time $\Delta t$ at every data acquisition instant subsequent to the initial reference point to obtain a travelled distance, comparing the obtained travelled distance with the distance between the front and rear wheels obtained in step a to find an inspection time corresponding to a minimum absolute value of the difference between the travelled distance and the distance between the front and rear wheels, and using this data acquisition instant as a target inspection point with respect to the initial reference point;

d. calculating the absolute coordinate of the target inspection point by extracting the x absolute coordinate, the y absolute coordinate, and the z absolute coordinate of the initial reference point and summing them respectively with the relative displacement dimension in the x direction, the relative displacement dimension in the y direction, and the relative displacement dimension in the z direction of the target inspection point calculated in step b of the second stage to obtain the absolute coordinate in the x direction, the absolute coordinate in the y direction, and the absolute coordinate in the z direction of the target inspection point;

e. modifying the data acquisition instant following the initial reference point in step c to the initial reference point;

f. repeating step b until calculation of the absolute coordinate is completed for all the target inspection points;

a fourth stage of plotting and display, in which the absolute coordinate of each of the target inspection points is plotted in an upper computer to complete the visual inspection.

An apparatus for patrol-inspection of a rigid cage channel in accordance with an embodiment of the present invention can realize safe and reliable adsorption in a mine hoisting system, and has an adsorption manner that poses no potential safety hazard to the operating environment of the coal mine enterprise. It can increase the speed of rigid cage channel inspection and save time of equipment inspection, thereby indirectly improving the production efficiency of the coal mine enterprise. It uses a patrol-inspection method that can substantially improve the accuracy in patrol-inspection of the rigid cage channel and avoid manual operation errors, thereby ensuring safe and reliable operation of the hoisting system.

In the drawings: 1-main bottom plate, 2-moving member, 2-1-lock nut, 2-2-rubber skin, 2-3-horizontal bearing seat B, 2-4-front-wheel driving output shaft, 2-4-1-keyway, 2-4-2-on-shaft step D, 2-4-3-on-shaft step A, 2-4-4-on-shaft step B, 2-4-5-on-shaft step C, 2-4-6-bolt hole, 2-4-7-thread, 2-5-horizontal bearing seat A, 2-6-bearing A, 2-7-front-wheel driven output shaft, 2-8-bearing B, 2-9-wheel flange, 2-10-wheel hub, 2-11-permanent magnet, 2-11-1-sub-magnet, 2-12-rear-wheel driving output shaft, 2-13-rear-wheel driven output shaft; 3-transmission member, including 3-1-vertical bearing seat B, 3-2-worm, 3-3-rigid coupling, 3-4-vertical bearing seat A, 3-5-timing pulley, 3-6-timing belt, 3-7-worm wheel, 3-8-bearing C, 4-driving member, 4-1-motor bracket, 4-2-brushless DC motor, 4-3-driver, 5-guide member, 5-1-front-wheel guide wheel, 5-2-guide wheel frame, 5-3-spring link, 5-4-spring, 5-5-adjusting nut, 5-6-guide support, 5-7-rear-wheel guide wheel; 6-housing; 7-rigid cage channel.

DETAILED DESCRIPTION

Figure 1:
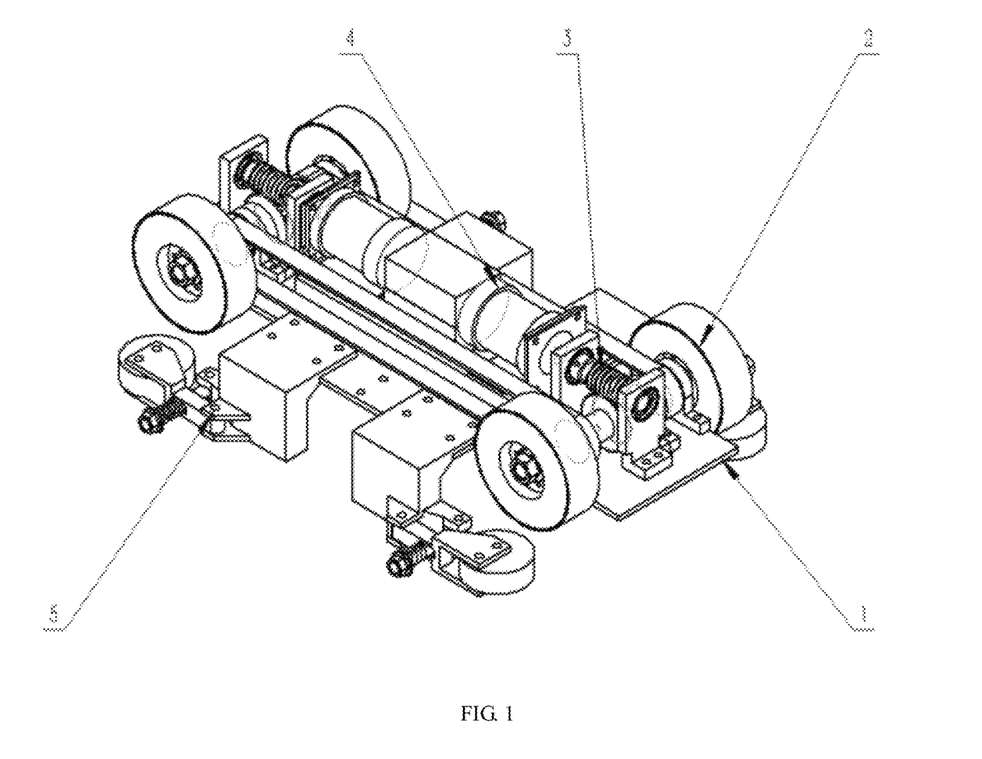
FIG. 1 is a schematic structural view of a patrol-inspection apparatus of an embodiment of the present invention.

As shown in FIG. 1, an apparatus for patrol-inspection of a rigid cage channel of an embodiment of the present invention includes a main bottom plate 1 and a moving member 2, a transmission member 3, a driving member 4, a guide member 5, and a housing 6 disposed on the main bottom plate 1.

Figure 2:
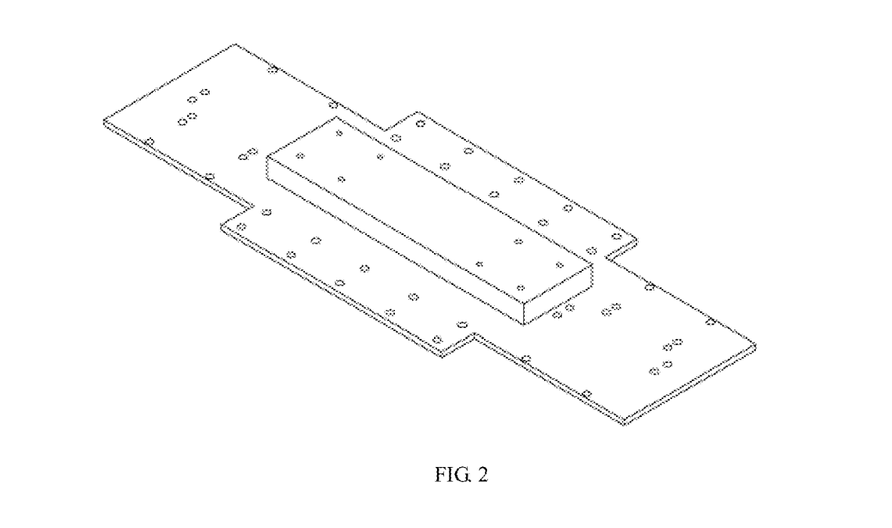
FIG. 2 is a schematic view showing parts of a bottom plate of the patrol-inspection apparatus of an embodiment of the present invention.

As shown in FIG. 2, a plurality of assembly holes are provided in the main bottom plate 1 for bolt connection between various members.

Figure 3:
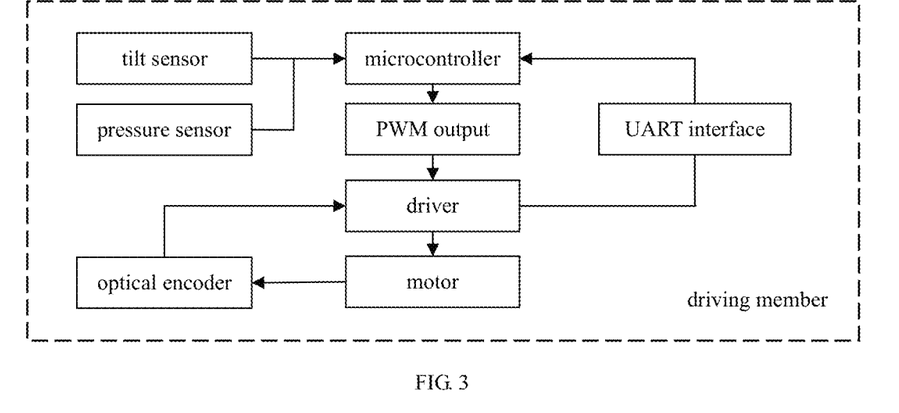
FIG. 3 is a structural block diagram of a driving member of the patrol-inspection apparatus of an embodiment of the present invention.
Figure 4:
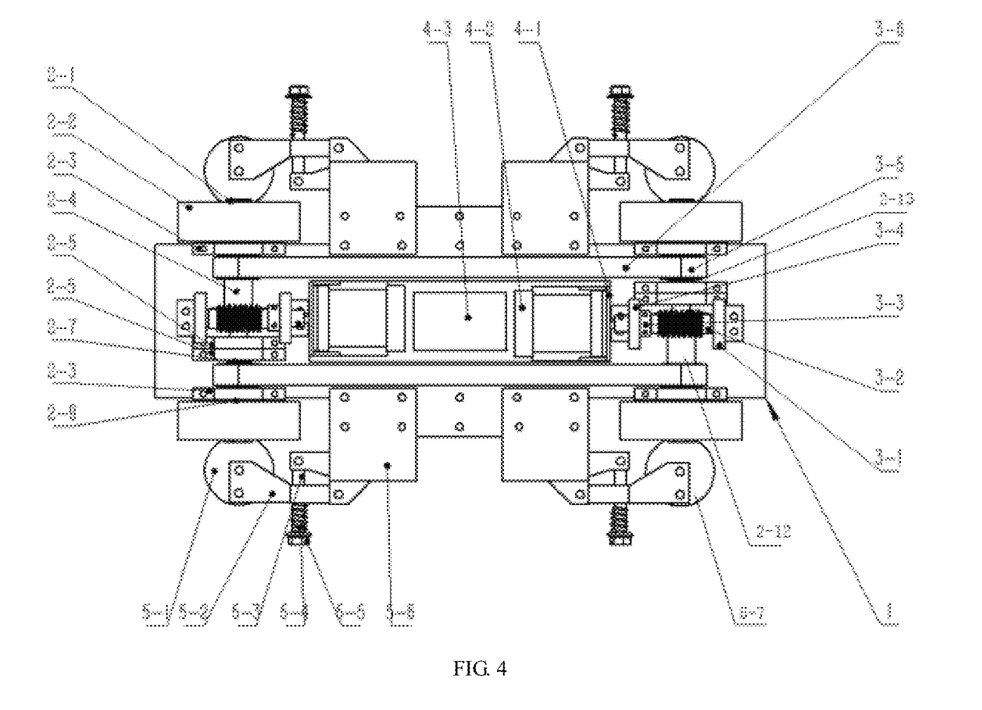
FIG. 4 is a schematic view showing the assembly of the patrol-inspection apparatus of an embodiment of the present invention.

As shown in FIGS. 3 and 4, the housing 6 is disposed at the middle portion of the main bottom plate 1, the driving member 4 is disposed inside the housing 6, the driving member 4 includes a tilt sensor and a pressure sensor, the tilt sensor and the pressure sensor are connected to a microcontroller, the microcontroller is connected to a driver 4-3, the driver 4-3 is connected to a brushless DC motor 4-2, and an output shaft of the brushless DC motor 4-2 is provided with an optical encoder, the optical encoder is connected to the driver 4-3. The brushless DC motor 4-2 is fixed to a motor bracket 4-1, and the motor bracket 4-1 and the driver 4-3 are both fixed to a boss of the bottom plate 1.

An external power supply provides power to the DC brushless motor 4-2 through the driver 4-3. The tilt sensor ensures accurate adjustment of the motor speed. The microcontroller outputs PWM to realize speed control of the driver 4-3 and reads speed information of the motor through a UART interface of the driver as an important parameter for calculation and inspection of defects in the target.

As shown in FIGS. 4 to 7, the moving member 2 includes a front-wheel driving output shaft 2-4, a front-wheel driven output shaft 2-7, a rear-wheel driving output shaft 2-12, and a rear-wheel driven output shaft 2-13. The front-wheel driving output shaft 2-4 and the front-wheel driven output shaft 2-7 are located at a front end of the main bottom plate 1. The rear-wheel driving output shaft 2-12 and the rear-wheel driven output shaft 2-13 are located at a rear end of the main bottom plate 1. A wheel flange 2-9 is provided at each of the front-wheel driving output shaft 2-4, the front-wheel driven output shaft 2-7, the rear-wheel driving output shaft 2-12, and the rear-wheel driven output shaft 2-13. The wheel flange 2-9 is connected with a wheel hub 2-10. A permanent magnet 2-11 is provided in the wheel hub 2-10, and a rubber skin 2-2 is provided on the outer side of the wheel hub.

Bolts on the wheel flanges 2-9 are mated with bolt holes 2-4-6 on the front-wheel driving output shaft 2-4, the front-wheel driven output shaft 2-7, the rear-wheel driving output shaft 2-12, and the rear-wheel driven output shaft 2-13 for axial positioning of the wheel flanges 2-9. Keys on the worm wheel 3-7 are mated with keyways 2-4-1 on the front-wheel driving output shaft 2-4 and the rear-wheel driving output shaft 2-12 for circumferential positioning of the worm wheel 3-7. Timing pulleys 3-5 are fixed relative to the front-wheel driving output shaft 2-4, the front-wheel driven output shaft 2-7, the rear-wheel driving output shaft 2-12, and the rear-wheel driven output shaft 2-13 through set screws for circumferential positioning of the timing pulleys 3-5.

One end of each of the front-wheel driving output shaft 2-4, the front-wheel driven output shaft 2-7, the rear-wheel driving output shaft 2-12, and the rear-wheel driven output shaft 2-13 has a thread 2-4-7. The thread 2-4-7 is mated with a lock nut 2-1 for further axial positioning of the wheel flange 2-9. The other end of the each of the front-wheel driving output shaft 2-4, the front-wheel driven output shaft 2-7, the rear-wheel driving output shaft 2-12, and the rear-wheel driven output shaft 2-13 is mated with a bearing A2-6 and the bearing A2-6 is fixed to a horizontal bearing seat A2-5. A middle portion of each of the front-wheel driving output shaft 2-4, the front-wheel driven output shaft 2-7, the rear-wheel driving output shaft 2-12, and the rear-wheel driven output shaft 2-13 is mated with a bearing B2-8 and the bearing B2-8 is fixed to a horizontal bearing seat B2-3. The horizontal bearing seat A2-5 and the horizontal bearing seat B2-3 are both fixed to the main bottom plate 1.

The front-wheel driving output shaft 2-4, the front-wheel driven output shaft 2-7, the rear-wheel driving output shaft 2-12, and the rear-wheel driven output shaft 2-13 each have an on-shaft step A2-4-3 for mounting and positioning the timing pulley 3-5, an on-shaft step B2-4-4 for mounting and positioning the bearing B2-8, and an on-shaft step C2-4-5 for mounting and positioning the wheel flange 2-9, and the front-wheel driving output shaft 2-4 and the rear wheel driving output shaft 2-12 further have an on-shaft step D2-4-2 for mounting and positioning the worm wheel 3-7.

Figure 5:
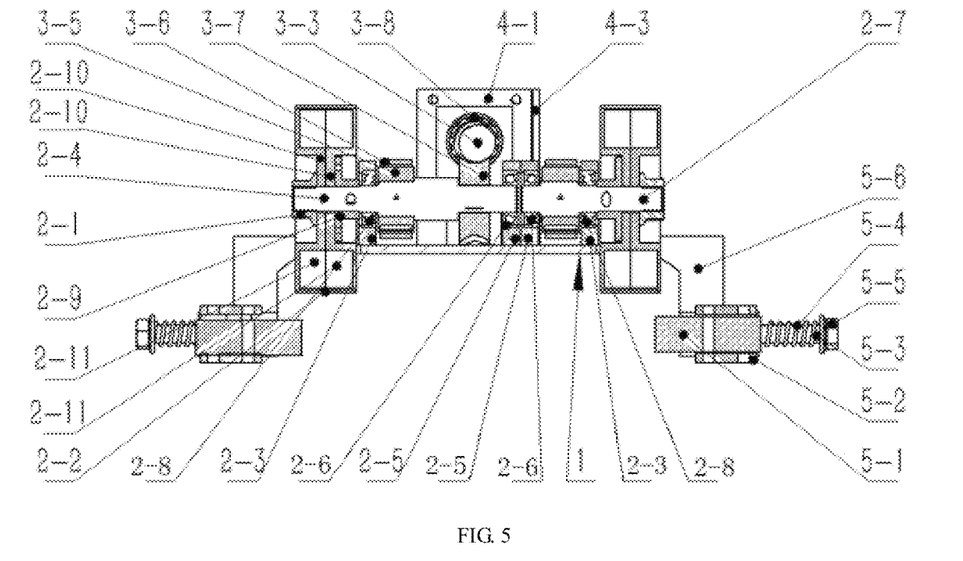
FIG. 5 is a schematic cross-sectional view of the patrol-inspection apparatus of an embodiment of the present invention.
Figure 6:
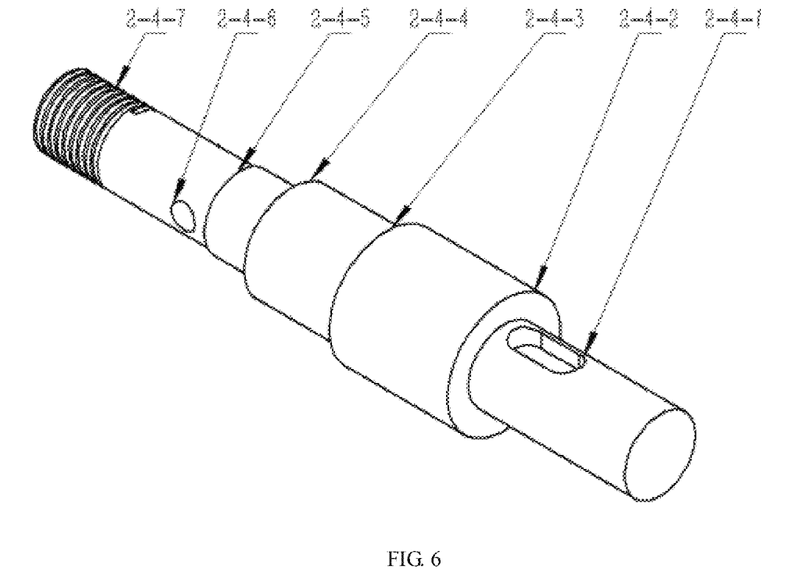
FIG. 6 is a schematic view showing parts of a driving output shaft of the patrol-inspection apparatus of an embodiment of the present invention.
Figure 7:
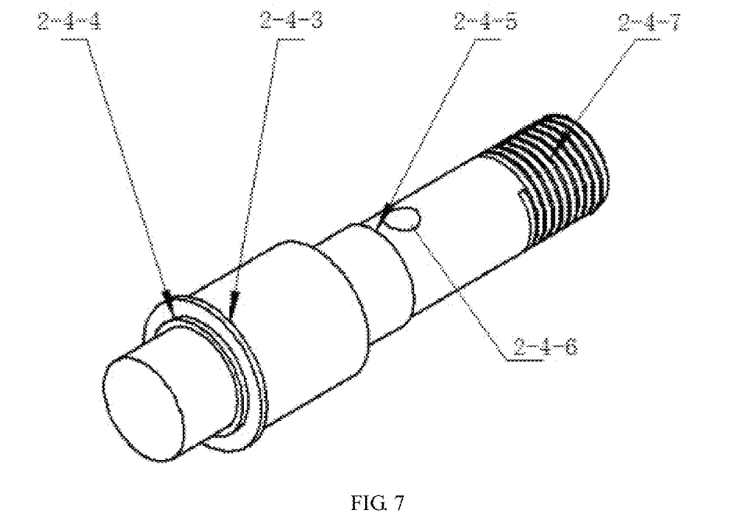
FIG. 7 is a schematic view showing parts of a driven output shaft of the patrol-inspection apparatus of an embodiment of the present invention.

As shown in FIGS. 4 and 5, the transmission member 3 includes a worm 3-2 connected with the output shaft of the brushless DC motor 4-2, a worm wheel 3-7 disposed on the front-wheel driving output shaft 2-4 and the rear-wheel driving output shaft 2-12 and meshed with the worm 3-2, and timing pulleys 3-5 disposed at the front-wheel driving output shaft 2-4, the front-wheel driven output shaft 2-7, the rear-wheel driving output shaft 2-12, and the rear-wheel driven output shaft 2-13. A timing belt 3-6 is wound on the timing pulleys 3-5 of the front-wheel driving output shaft 2-4 and the rear-wheel driven output shaft 2-13, and a timing belt 3-6 is wound on the timing pulleys 3-5 of the front-wheel driven output shaft 2-7 and the rear-wheel driving output shaft 2-12. One end of the worm 3-2 is connected with the output shaft of the brushless DC motor 4-2 via a rigid coupling 3-3, the rigid coupling 3-3 is fixedly mated with the bearing on the vertical bearing seat A3-4, the other end of the worm 3-2 is mated with the bearing C3-8, the bearing C3-8 is fixed to the vertical bearing seat B3-1, and the vertical bearing seat A3-4 and the vertical bearing seat B3-1 are both fixed to the main bottom plate 1.

The timing pulleys 3-5 on the front-wheel driving output shaft 2-4 and the rear-wheel driven output shaft 2-13 perform power transmission through a timing belt 3-6 to transmit power from the driving member to the moving member. The timing pulleys 3-5 on the front-wheel driven output shaft 2-7 and the rear-wheel driving output shaft 2-12 perform power transmission through a timing belt 3-6 to enable power transmission in a switched direction and driving of the patrol-inspection apparatus on both sides.

Figure 8:
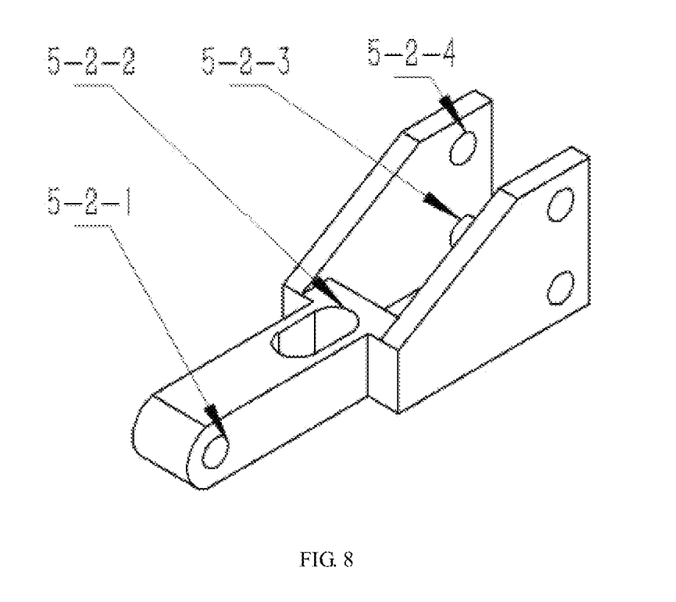
FIG. 8 is a schematic view showing parts of a guide wheel frame of the patrol-inspection apparatus of an embodiment of the present invention.

As shown in FIGS. 4, 5, and 8, the guide member 5 includes a front-wheel guide wheel 5-1 and a rear-wheel guide wheel 5-7. The front-wheel guide wheel 5-1 and the rear-wheel guide wheel 5-7 are both disposed on the outside of the wheel hub 2-10.

The front-wheel guide wheel 5-1 and the rear-wheel guide wheel 5-7 are both hinged with one end of the guide wheel frame 5-2 through adjustable hinge holes. The adjustable hinge holes include a primary hole hinge 5-2-3 and a secondary hole hinge 5-2-4. The other end of the guide wheel frame 5-2 is hinged with a guide support 5-6 through a hinge hole 5-2-1. The guide support 5-6 is fixed to the main bottom plate 1. One end of a spring link 5-3 is hinged with the guide support 5-6 through a hinge hole, and the other end of the spring link 5-3 passes through an elliptical hole 5-2-2 in the middle portion of the guide wheel frame 5-2 and has an adjusting nut 5-5. A spring 5-4 is sleeved on a spring link 5-3 between the adjusting nut 5-5 and the guide wheel frame 5-2. The pressure sensor of the driving member 4 is disposed between the adjusting nut 5-5 and the spring 5-4.

The front-wheel guide wheel 5-1 and the rear-wheel guide wheel 5-7 are hinged with the guide wheel frame 5-2 through the primary hole hinge 5-2-3 for large-width inspection. The front-wheel guide wheel 5-1 and the rear-wheel guide wheel 5-7 are hinged with the guide wheel frame 5-2 through the secondary hole hinge 5-2-4 for small-width inspection. By adjusting the position of the adjustment nut 5-5 to change the amount of compression of the spring 5-4, the initial pressures between the front-wheel guide wheel 5-1 and the rear-wheel guide wheel 5-7 and the target under inspection are changed, thereby enabling guiding by the guide wheels during the inspection.

In this embodiment, the axle of the front-wheel guide wheel 5-1, the front-wheel driving output shaft 2-4, and the front-wheel driven output shaft 2-7 are located in the same plane, and the rear-wheel guide wheel 5-7, the rear-wheel driving output shaft 2-12, and the rear-wheel driven output shaft 2-13 are located in the same plane.

Figure 9:
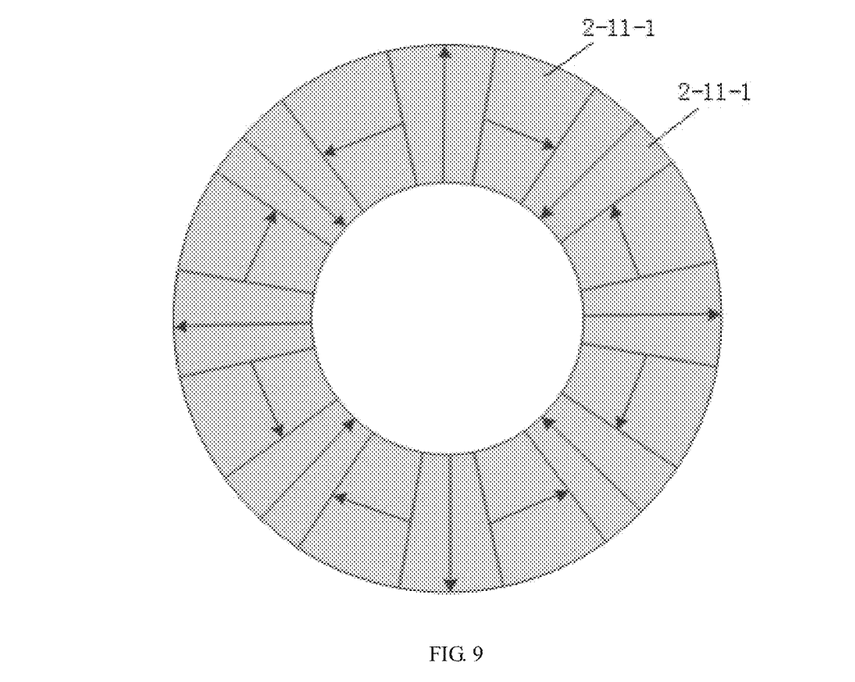
FIG. 9 is a schematic structural view of a permanent magnet of the patrol-inspection apparatus of an embodiment of the present invention.

As shown in FIG. 9, the permanent magnet 2-11 includes eight pairs of sub-magnets 2-11-1 made of rare-earth neodymium iron boron arranged in a Halbach array with an angle between magnetization directions of two adjacent sub-magnets 2-11-1 being 67.5 degrees.

Figure 10:
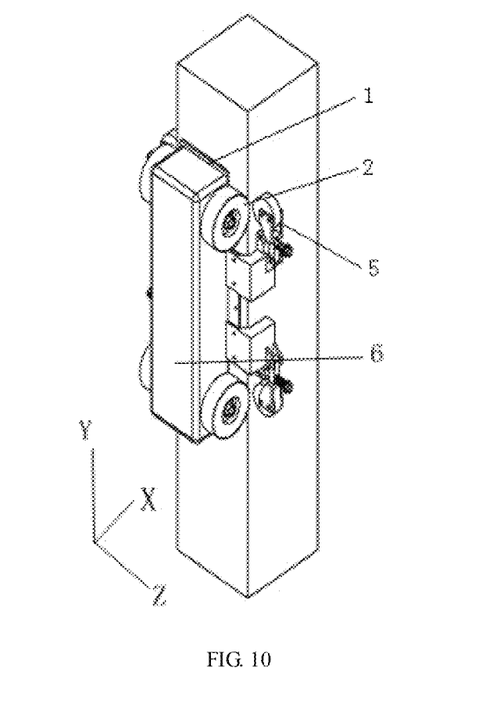
FIG. 10 is a schematic view showing the installation of the patrol-inspection apparatus of an embodiment of the present invention on a rigid cage channel.
Figure 11:
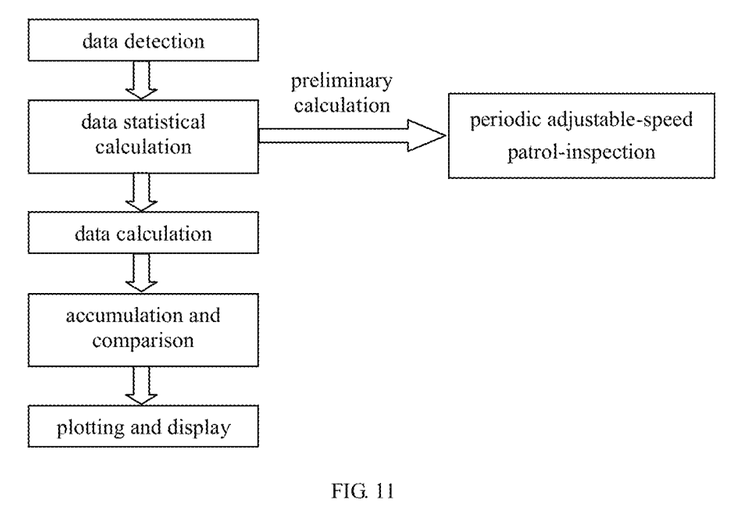
FIG. 11 is a flow chart of a method for processing patrol-inspection data of the patrol-inspection apparatus of an embodiment of the present invention.

As shown in FIGS. 10 and 11, the patrol-inspection apparatus of an embodiment of the present invention is installed on a rigid cage channel 7. The driving member 4 transmits power to the moving member 2 through the transmission member 3, and the moving member 2 enables safe adsorption and operation of the patrol-inspection apparatus by means of the absorption characteristic of its permanent magnet 2-11. The front-wheel guide wheel 5-1 and the rear-wheel guide wheel 5-7 of the guide member 5 are pressed against the rigid cage channel by means of the adjustable spring 5-4. The detection device detects the travel speed of the patrol-inspection apparatus through an optical encoder, detects the position and orientation of the patrol-inspection apparatus through a tilt sensor, and detects the state of the target under inspection in real time through a detection algorithm.

As shown in FIG. 11, a method for patrol-inspection of a rigid cage channel by the patrol-inspection apparatus described above comprises the following steps:

a first stage of statistical calculation of data and periodic adjustable-speed patrol-inspection, in which data acquired by the tilt sensor, the optical encoder, and the pressure sensor throughout operation of the patrol-inspection apparatus is used as raw data for processing and adjustable-speed patrol-inspection control is performed on the patrol-inspection apparatus based on the processing results, including specifically:

a. based on a data acquisition frequency of the tilt sensor, the optical encoder, and the pressure sensor, taking data acquisition instants of the tilt sensor, the optical encoder, and the pressure sensor as a time sequence for data arrangement, matching the data of tilt angles $\theta_z$ and $\theta_x$ detected by the tilt sensor, the data of speed v detected by the optical encoder, and the data of pressures P1 and P2 detected by the pressure sensor at each data acquisition instant with each other and reading the data into an upper computer as raw data, wherein the tilt angle $\theta_z$ is an angle between the y-axis and the x-y plane, the tilt angle $\theta_x$ is an angle between the y-axis and the y-z plane, the y-axis is parallel to the rigid cage channel and perpendicular to the front-wheel driving output shaft, the x-axis is perpendicular to the front-wheel driving output shaft and perpendicular to the rigid cage channel, the z-axis is perpendicular to the rigid cage channel and parallel to the front-wheel driving output shaft, the speed v is an operating speed of the patrol-inspection apparatus, the pressure P1 is a pressure applied to the rigid cage channel by the front-wheel guide wheel, and the pressure P2 is a pressure applied to the rigid cage channel by the rear-wheel guide wheel.

b. accumulating successively a product of the speed v and the inspection time Δt at every data acquisition instant to obtain a travelled distance, comparing the obtained travelled distance with (L1-L2), if the result is less than (L1-L2), performing, automatically by the patrol-inspection apparatus, high-speed patrol-inspection, if the result is greater than (L1-L2), continuing with accumulation and comparison of the result with L1, if the result is greater than (L1-L2) and less than L1, performing, by the patrol-inspection apparatus, low-speed patrol-inspection, and if the result is greater than L1, clearing the accumulated result to complete a cycle of adjustable-speed patrol-inspection process, wherein Δt is a time difference between two adjacent data acquisition instants, the rigid cage channel is generally made up of several segments of rigid cage channel in series, and defects in the rigid cage channel are mainly located at joints between such segments, in view of this, high-speed patrol-inspection is performed at the middle area of the rigid cage channel in order to save the patrol-inspection time, and low-speed patrol-inspection is performed at joining areas close to the ends of the rigid cage channel in order to ensure the patrol-inspection accuracy, so L1 is set as a total length of a single segment of rigid cage channel, and L2 is manually defined as a high-speed patrol-inspection length at the joints of the ends of a single segment of rigid cage channel;

c. taking the last data acquisition instant of the previous patrol-inspection cycle as the starting point;

d. returning to and performing step b until the periodic adjustable-speed inspection is completed for the entire target under inspection, and storing all the detected data;

a second stage of calculation in which the statistical data is processed, including specifically:

a. extracting the tilt angles $\theta_z$ and $\theta_x$ at each time acquisition instant, and calculating a difference value between the pressures P1 and P2 at this instant, determining whether the difference value is 0, if the difference value is zero, determining the tilt angle $\theta_z$ as valid, and if the difference value is not zero, determining the tilt angle $\theta_z$ as invalid and taking a value of 0;

b. calculating a relative displacement dimension in the x direction, a relative displacement dimension in the y direction, and a relative displacement dimension in the z direction of the front-wheel driving output shaft with respect to the rear-wheel driven output shaft at each data acquisition instant, wherein the relative displacement dimension in the x direction is calculated as a distance between the front and rear wheels multiplied by a cosine value of the tile angle $\theta_z$ and then multiplied by a sine value of the tilt angle $\theta_x$, the relative displacement dimension in the y direction is calculated as the distance between the front and rear wheels multiplied by a cosine value of the tile angle $\theta_z$ and then multiplied by a cosine value of the tilt angle $\theta_x$, and the relative displacement dimension in the z direction is calculated as the distance between the front and rear wheels multiplied by a cosine value of the tile angle $\theta_x$ and then multiplied by a sine value of the tilt angle $\theta_z$, wherein the distance between the front and rear wheels is a dimension of the spacing between the front-wheel driving output shaft and the rear-wheel driven output shaft;

c. storing the calculated results and completing calculation of all the data;

a third stage of accumulation and comparison, including specifically:

a. assuming that the patrol-inspection apparatus is in a first patrol-inspection cycle and the absolute coordinate of the front-wheel driving output shaft at each data acquisition instant is known, where the x direction is 0, the y direction is an accumulated value of a speed v multiplied by the patrol-inspection time of the patrol-inspection apparatus, and the z direction is 0, such an assumption being consistent with an initial operating-condition determination of the rigid cage channel inspection that there is no defect in the rigid cage channel during a first travel cycle;

b. selecting a first data acquisition instant during the first patrol-inspection cycle as an initial reference point;

c. accumulating successively a product of the speed v and the inspection time Δt at every data acquisition instant subsequent to the initial reference point to obtain a travelled distance, comparing the obtained travelled distance with the distance between the front and rear wheels obtained in step a to find an inspection time corresponding to a minimum absolute value of the difference value between the travelled distance and the distance between the front and rear wheels, and using this data acquisition instant as a target inspection point with respect to the initial reference point;

d. calculating the absolute coordinate of the target inspection point by extracting the x absolute coordinate, the y absolute coordinate, and the z absolute coordinate of the initial reference point and summing them respectively with the relative displacement dimension in the x direction, the relative displacement dimension in the y direction, and the relative displacement dimension in the z direction of the target inspection point calculated in step b of the second stage to obtain the absolute coordinate in the x direction, the absolute coordinate in they direction, and the absolute coordinate in the z direction of the target inspection point;

e. modifying the data acquisition instant following the initial reference point in step c to the initial reference point;

f. repeating step b until calculation of the absolute coordinate is completed for all the target inspection points;

a fourth stage of plotting and display, the absolute coordinate of each of the target inspection points is plotted in an upper computer to complete the visual patrol-inspection.

In general, in the following claims, the terms used should not be construed to limit the claims to the specific embodiments disclosed in the specification and the claims, but should be construed to include all possible embodiments along with the full scope of equivalents to which such claims are entitled.

What is claimed is:

1. An apparatus for patrol-inspection of a rigid cage channel, comprising:
   a main bottom plate;
   a moving assembly;
   a transmission assembly;
   a driving assembly;
   a guide assembly; and
   a housing disposed on the main bottom plate;
   wherein the housing is disposed at a middle portion of the main bottom plate, the driving assembly is disposed inside the housing, the driving assembly comprises a tilt sensor and a pressure sensor both connected to a microcontroller, the microcontroller is connected to a driver, the driver is connected to a brushless DC motor, and an output shaft of the brushless DC motor is provided with an optical encoder connected to the driver;
   wherein the moving assembly comprises a front-wheel driving output shaft, a front-wheel driven output shaft, a rear-wheel driving output shaft, and a rear-wheel driven output shaft, the front-wheel driving output shaft and the front-wheel driven output shaft are located at a front end of the main bottom plate, the rear-wheel driving output shaft and the rear-wheel driven output shaft are located at a rear end of the main bottom plate, a wheel flange is provided at each of the front-wheel driving output shaft, the front-wheel driven output shaft, the rear-wheel driving output shaft, and the rear-wheel driven output shaft each wheel flange is connected with a respective wheel hub, a respective permanent magnet device is provided in each wheel hub, and a respective rubber skin is provided on the outer side of each wheel hub;
   wherein the transmission assembly comprises a worm connected with the output shaft of the brushless DC motor, a worm wheel disposed on the front-wheel driving output shaft and the rear-wheel driving output shaft and meshed with the worm, timing pulleys disposed at the front-wheel driving output shaft, the front-wheel driven output shaft, the rear-wheel driving output shaft, and the rear-wheel driven output shaft, a timing belt is wound on the timing pulleys of the front-wheel driving output shaft and the rear-wheel driven output shaft, and a timing belt is wound on the timing pulleys of the front-wheel driven output shaft and the rear-wheel driving output shaft; and
   wherein the guide assembly comprises a front-wheel guide wheel and a rear-wheel guide wheel, and the front-wheel guide wheel and the rear-wheel guide wheel are both generally disposed outside of a plane defined by an exterior lateral surface of a respective wheel hub.

2. The apparatus for patrol-inspection of a rigid cage channel according to claim 1, wherein the front-wheel guide wheel and the rear-wheel guide wheel are hinged with one end of a guide wheel frame through a first hinge hole, the other end of the guide wheel frame is hinged with a guide support through a second hinge hole, the guide support is fixed to the main bottom plate, one end of a spring link is hinged with the guide support through a third hinge hole, the other end of the spring link passes through an elliptical hole in a middle portion of the guide wheel frame and is provided with an adjusting nut, a spring is sleeved on the spring link between the adjusting nut and the guide wheel frame, and a pressure sensor of the driving assembly is disposed between the adjusting nut and the spring.

3. The apparatus for patrol-inspection of a rigid cage channel according to claim 2, wherein an axle of the front-wheel guide wheel, the front-wheel driving output shaft, and the front-wheel driven output shaft are located in the same plane, and the rear-wheel guide wheel, the rear-wheel driving output shaft, and the rear-wheel driven output shaft are located in the same plane.

4. The apparatus for patrol-inspection of a rigid cage channel according to claim 3, wherein bolts on the wheel flanges are mated with bolt holes on the front-wheel driving output shaft, the front-wheel driven output shaft, the rear-wheel driving output shaft, and the rear-wheel driven output shaft, keys on the worm wheel are mated with keyways on the front-wheel driving output shaft and the rear-wheel driving output shaft, and the timing pulleys are fixed relative to the front-wheel driving output shaft, the front-wheel driven output shaft, the rear-wheel driving output shaft, and the rear-wheel driven output shaft through set screws.

5. The apparatus for patrol-inspection of a rigid cage channel according to claim 4, wherein one end of each of the front-wheel driving output shaft, the front-wheel driven output shaft, the rear-wheel driving output shaft, and the rear-wheel driven output shaft has a thread and each thread is mated with a respective lock nut, the other end of each of the front-wheel driving output shaft, the front-wheel driven output shaft, the rear-wheel driving output shaft, and the rear-wheel driven output shaft is mated with a first bearing and the first bearing is fixed to a first horizontal bearing seat, a middle portion of each of the front-wheel driving output shaft, the front-wheel driven output shaft, the rear-wheel driving output shaft, and the rear-wheel driven output shaft is mated with a second bearing and the second bearing is fixed to a second horizontal bearing seat, and the first horizontal bearing seat and the second horizontal bearing seat are both fixed to the main bottom plate.

6. The apparatus for patrol-inspection of a rigid cage channel according to claim 5, wherein the front-wheel driving output shaft, the front-wheel driven output shaft, the rear-wheel driving output shaft, and the rear-wheel driven output shaft each have a respective first on-shaft step for mounting and positioning the timing pulley, a respective second on-shaft step for mounting and positioning the second bearing, and a respective third on-shaft step for mounting and positioning the wheel flange, and the front-wheel driving output shaft and the rear wheel driving output shaft each further have a respective fourth on-shaft step for mounting and positioning the worm wheel.

7. The apparatus for patrol-inspection of a rigid cage channel according to claim 6, wherein one end of the worm is connected with the output shaft of the brushless DC motor via a rigid coupling, the rigid coupling is fixedly mated with the first bearing on the first vertical bearing seat, the other end of the worm is mated with a third bearing, and the third bearing is fixed to the second vertical bearing seat.

8. The apparatus for patrol-inspection of a rigid cage channel according to claim 7, wherein an output of the microcontroller is connected to an input of the driver through a pulse width modulation module, and an output of the driver is connected to an input of the microcontroller through a universal asynchronous receiving-transmitter interface.

9. The apparatus for patrol-inspection of a rigid cage channel according to claim 8, wherein the permanent magnet device comprises eight pairs of sub-magnets made of rare-earth neodymium iron boron arranged in a Halbach array with an angle between magnetization directions of two adjacent sub-magnets being 67.5 degrees.

* * * * *